(12) United States Patent
Hekmat et al.

(10) Patent No.: US 11,355,796 B2
(45) Date of Patent: Jun. 7, 2022

(54) THERMAL MANAGEMENT SYSTEM FOR BATTERY MODULE

(71) Applicants: Shahriyar Hekmat, Tehran (IR); Gholam Reza Molaeimanesh, Tehran (IR)

(72) Inventors: Shahriyar Hekmat, Tehran (IR); Gholam Reza Molaeimanesh, Tehran (IR)

( * ) Notice: Subject to any disclaimer, the term of this patent is extended or adjusted under 35 U.S.C. 154(b) by 176 days.

(21) Appl. No.: 16/811,333

(22) Filed: Mar. 6, 2020

(65) Prior Publication Data
US 2020/0335839 A1 Oct. 22, 2020

(51) Int. Cl.
*H01M 10/6552* (2014.01)
*H01M 10/6568* (2014.01)
*H01M 10/613* (2014.01)
*H01M 10/625* (2014.01)
*H01M 10/6563* (2014.01)

(52) U.S. Cl.
CPC ..... *H01M 10/6552* (2015.04); *H01M 10/613* (2015.04); *H01M 10/625* (2015.04); *H01M 10/6563* (2015.04); *H01M 10/6568* (2015.04)

(58) Field of Classification Search
CPC ............. H01M 10/625; H01M 10/613; H01M 10/6552; H01M 10/6568; H01M 10/6563
See application file for complete search history.

(56) References Cited

U.S. PATENT DOCUMENTS

2014/0011059 A1* 1/2014 Hashimoto ....... H01M 10/6556
429/72
2019/0288351 A1* 9/2019 Son ..................... H01M 10/653

* cited by examiner

*Primary Examiner* — Karie O'Neill Apicella

(57) ABSTRACT

The present invention discloses a thermal management system for a battery module of an electric vehicle. The battery module is incorporated with phase change material (PCM)-metal foam and cooling water arrangement of two opposing fluid currents. At least one PCM-metal foam is disposed at either side of each battery cell of the module to cool and maintain an optimal temperature of the battery cells The system comprises a controller in communication with the cooling water arrangement and a sensor at the battery module, and a first cooler module and a second cooler module in communication with the controller and cooling water arrangement. The controller is configured to activate the first cooler module on failure to maintain the optimal temperature by the PCM-metal foam, and the controller is configured to activate the second cooler module on failure to maintain the optimal temperature by the first cooler module and the PCM-metal foam.

17 Claims, 10 Drawing Sheets

THERMAL MANAGEMENT SYSTEM FOR BATTERY MODULE

BACKGROUND OF THE INVENTION

In consideration of the future of the environment, there has been much attention focused on environmentally friendly electric vehicles. Electric vehicles require onboard batteries to power their electric drive systems. Particularly, advanced batteries (e.g. Lithium-ion, Lithium-polymer, etc.) having high energy density are preferred compared to other batteries and are a better option to be used in hybrid vehicles and electric vehicles. The performance of electric cars heavily depends on the temperature of the batteries. Batteries deviating out of their operating temperature could dramatically decline the efficiency and service life of the vehicles as well as the batteries.

Investigations and analysis on the advanced batteries show that the optimum temperature for best performance and longer life for these types of batteries is between 20 and 40 degrees Celsius. The temperature difference between the battery cells connected in a module should not exceed 5 degrees Celsius. Therefore, by improving the process of placing these batteries at their optimum temperature, the performance and output of the electric vehicles could be maximized.

Since a single advanced battery cell alone cannot provide the energy needed to drive a hybrid and electric vehicle, a set of advanced battery cells are ganged in series and parallel. The high charge and discharge rate of the set of batteries would increase the temperature drawing on electrochemical reactions and electron passage and would result in an increased temperature throughout the battery set. In case the temperature is left unchecked, it would shorten the life span, reduce capacity, or even in the case of an emergency, cause a battery explosion. Further, the set of battery cells should also work at approximately the same temperature to prevent uneven charging and discharging in the cells. It also reduces battery life. Therefore, a proper thermal management system is deemed to be highly essential for the use of these types of batteries.

Most studies show that heat dissipation cannot be eliminated significantly by natural air or forced air circulation, especially in large batteries. A proper thermal management system maintains the batteries at optimum operating temperature to increase the performance and life of the batteries. The improved battery performance results in increase in the performance and efficiency of the vehicle or electric car. This would ultimately increase the popularity of these types of cars, which could be increased by producing and consuming these cars. The release and emission of pollutants into the environment and air pollution having turned out to be of the most serious threats today could be prevented.

Therefore, there is a need for a thermal management system to neutralize and eliminate the above discussed problems in the battery module and to control the temperature of the battery cells as well as the temperature difference between cells within a specified range.

SUMMARY OF THE INVENTION

The present invention discloses a thermal management system for a battery module of an electric vehicle. The system utilizes phase change material-metal foam and cooling water arrangement/cooling circuit of two opposing fluid currents to maintain the temperature of the battery module at optimum and functional range.

The system comprises an energy storage module comprising a set of battery cells, and a temperature sensor and at least one phase change material (PCM)-metal foam disposed at spaces of either side of each battery cells is configured to cool and maintain an optimal temperature of the set of battery cells. The system further comprises a cooling circuit having at least two cooling pipes extending through each PCM-metal foam in thermal communication with the set of battery cells. The at least two cooling pipes have opposing fluid flow paths.

The system further comprises a first cooler module in communication with the cooling circuit. The first cooler module is configured to cool the set of battery cells by circulating a heat exchange fluid via a first coolant path. The system further comprises a second cooler module in communication with the cooling circuit. The second cooler module is configured to cool the set of battery cells by circulating the heat exchange fluid via a second coolant path.

The system further comprises a controller in communication with the first cooler module, the second cooler module and the temperature sensor. The controller is configured to activate the first cooler module on failure to maintain the optimal temperature by the PCM-metal foam. The controller is further configured to activate the second cooler module on failure to maintain the optimal temperature by the first cooler module and the PCM-metal foam.

The system further comprises a pump in communication with the controller. The first cooler module comprises a radiator and a cooling fan. The second cooler module comprises a cooling fan, a condenser, a compressor, and a heat exchanger. The system further comprises a first connecting pipe configured to connect outlets of at least two cooling pipes to an inlet of the first cooler module. The system further comprises a second connecting pipe configured to connect an outlet of the first cooler module to an inlet of the second cooler module. The system further comprises a third connecting pipe configured to connect an outlet of the second cooler module to inlets of at least two cooling pipes. The system further comprises a bypass pipe configured to connect the outlet of the first cooler module and the outlet of the second cooler module.

The system further comprises a three-way motorized valve configured to connect the inlets of second connecting pipe and the bypass pipe to the outlet of the first cooler module. The system further comprises a three-way pipe configured to connect outlets of third connecting pipe and the bypass pipe to the inlets of at least two cooling pipes. The pump is disposed between the three-way pipe and the inlets of the at least two cooling pipes. The heat exchange fluid flowing through the first connecting pipe and bypass pipe forms the first coolant path. The heat exchange fluid flowing through the first connecting pipe, the second connecting pipe and the third connecting pipe forms the second coolant path.

The third connecting pipe comprises a check valve to prevent backflow of the heat exchanging fluid to the second cooler module. The PCM-metal foam disposed at spaces between the set of battery cells at lateral position comprises lower porosity. The PCM-metal foam disposed at spaces between the set of battery cells at middle position comprises higher porosity.

One aspect of the present disclosure is directed to a thermal management system, comprising: an energy storage module comprising a set of battery cells, and a temperature sensor; at least one phase change material (PCM)-metal foam disposed at spaces of either side of each battery cells configured to cool and maintain an optimal temperature of the set of battery cells; a cooling circuit comprises at least two cooling pipes extending through each PCM-metal foam in thermal communication with the set of battery cells, wherein the at least two cooling pipes have opposing fluid flow paths; a first cooler module in communication with the cooling circuit configured to cool the set of battery cells by circulating a heat exchange fluid via a first coolant path; a second cooler module in communication with the cooling circuit configured to cool the set of battery cells by circulating the heat exchange fluid via a second coolant path, and a controller in communication with the first cooler module, the second cooler module and the temperature sensor, wherein the controller is configured to activate the first cooler module on failure to maintain the optimal temperature by the PCM-metal foam, and wherein the controller is configured to activate the second cooler module on failure to maintain the optimal temperature by the first cooler module and the PCM-metal foam.

In one embodiment, the system further comprises a pump in communication with the controller. In another embodiment, the first cooler module comprises a radiator and a cooling fan. In one embodiment, the second cooler module comprises a cooling fan, a condenser, a compressor, and a heat exchanger. In another embodiment, the system further comprises a first connecting pipe configured to connect outlets of at least two cooling pipes to an inlet of the first cooler module. In another embodiment, the system further comprises a second connecting pipe configured to connect an outlet of the first cooler module to an inlet of the second cooler module.

In one embodiment, the system further comprises a third connecting pipe configured to connect an outlet of the second cooler module to inlets of at least two cooling pipes. In one embodiment, the system further comprises a bypass pipe configured to connect the outlet of the first cooler module and the outlet of the second cooler module. In one embodiment, the system further comprises a three-way motorized valve configured to connect the inlets of second connecting pipe and the bypass pipe to the outlet of the first cooler module. In one embodiment, the system further comprises a three-way pipe configured to connect outlets of third connecting pipe and the bypass pipe to the inlets of at least two cooling pipes. In a related embodiment, the pump is disposed between the three-way pipe and the inlets of the at least two cooling pipes.

In another embodiment, the heat exchange fluid flowing through the first connecting pipe and bypass pipe form the first coolant path. In yet another embodiment, the heat exchange fluid flowing through the first connecting pipe, the second connecting pipe and the third connecting pipe form the second coolant path. In a related embodiment, the third connecting pipe comprises a check valve to prevent backflow of the heat exchanging fluid to the second cooler module. In one embodiment, the PCM-metal foam disposed at spaces between the set of battery cells at lateral position comprises lower porosity. In another embodiment, the PCM-metal foam disposed at spaces between the set of battery cells at middle position comprises higher porosity.

Another aspect of the present disclosure is directed to a thermal management system, comprising: an energy storage module comprising a set of battery cells, and a temperature sensor; at least one PCM-metal foam disposed at spaces of either side of each battery cells configured to cool and maintain an optimal temperature of the set of battery cells, wherein the PCM-metal foam disposed at spaces between the set of battery cells at lateral position comprises lower porosity, and wherein the PCM-metal foam disposed at spaces between the set of battery cells at middle position comprises higher porosity; a cooling circuit comprises at least two cooling pipes extending through each PCM-metal foam in thermal communication with the set of battery cells, wherein the at least two cooling pipes have opposing fluid flow paths; a first cooler module in communication with the cooling circuit configured to cool the set of battery cells by circulating a heat exchange fluid via a first coolant path, wherein the first cooler module comprises a radiator and cooler fan; a second cooler module in communication with the cooling circuit configured to cool the set of battery cells by circulating the heat exchange fluid via a second coolant path, wherein the second cooler module comprises a cooling fan, a condenser, a compressor, and a heat exchanger, and a controller in communication with the first cooler module, the second cooler module, the temperature sensor, and a pump, wherein the controller is configured to activate the first cooler module on failure to maintain the optimal temperature by the PCM-metal foam, and wherein the controller is configured to activate the second cooler module on failure to maintain the optimal temperature by the first cooler module and the PCM-metal foam.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

The present invention generally relates to a thermal management system for battery module. More particularly, the present invention relates to a thermal management system comprising phase change material-metal foam and cooling water arrangement with two opposing fluid currents to maintain the temperature of a battery module at optimum and functional range.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
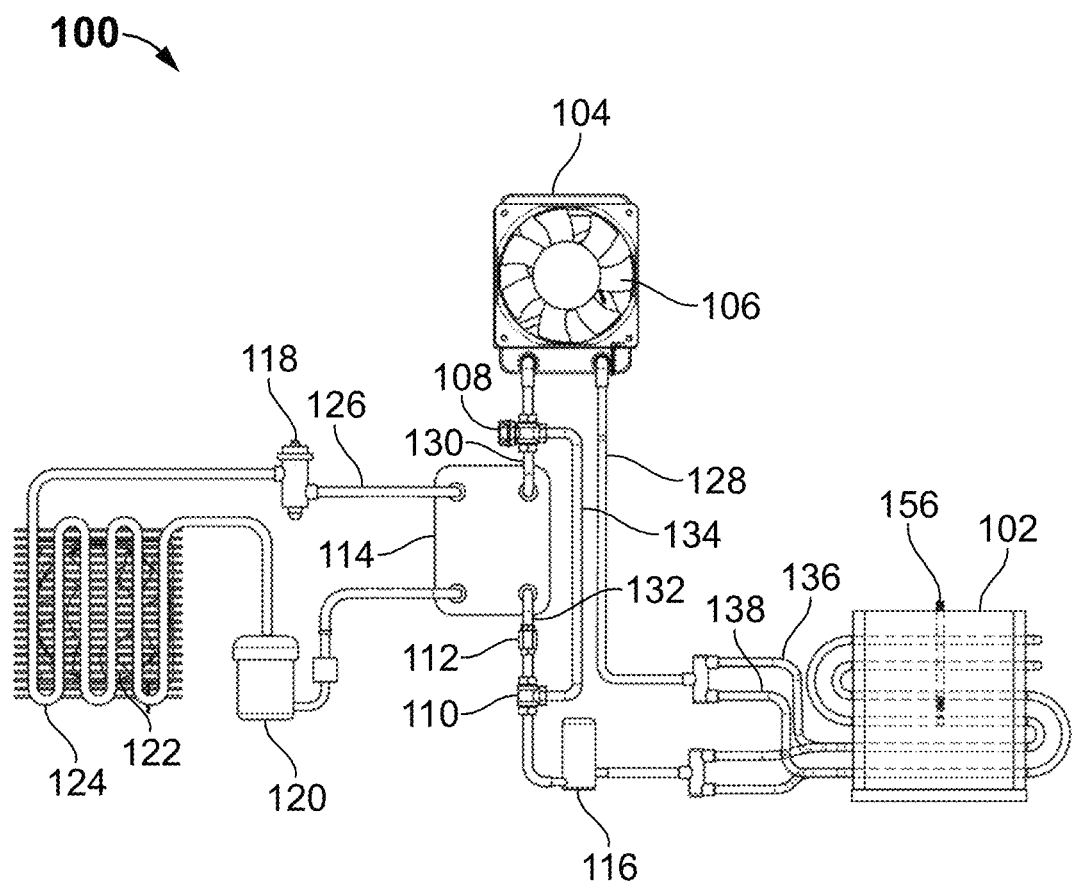
FIG. 1 exemplarily illustrates an energy management system, according to an embodiment of the present invention.

Referring to FIG. 1, a thermal management system 100 for a battery module 102 is disclosed, according to an embodiment of the present invention. The thermal management system 100 comprises an energy storage module or the battery module 102, a cooling circuit, a first cooler module, a second cooler module and a controller.

Figure 2:
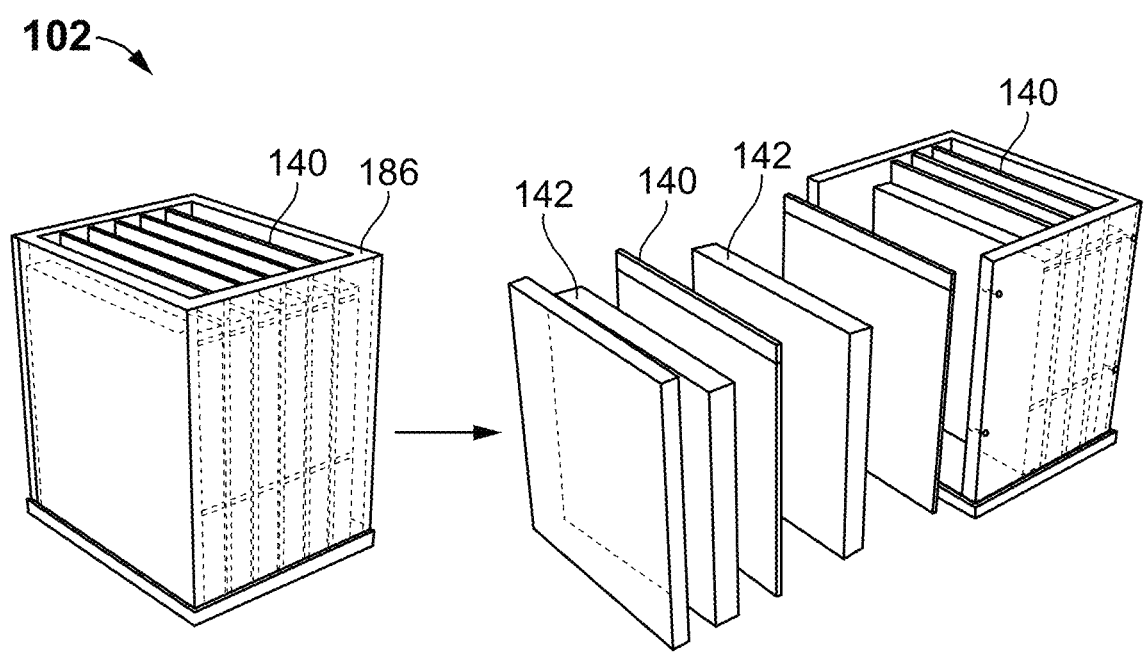
FIG. 2 exemplarily illustrates an energy storage module and arrangement of set of battery cells and phase change materials of the energy storage module, according to an embodiment of the present invention.

Referring to FIG. 2, the energy storage module 102 comprises housing 186 enclosed with a set of battery cells 140 connected in series and parallel and a plurality of phase change materials (PCMs) incorporated within metal-based foams, herein after referred as PCM metal foams 142 and a temperature sensor 156. The set of battery cells are configured to undergo charging and discharging operations.

At least one PCM metal foam 142 disposed at spaces of either side of each battery cell 140 are configured to cool and maintain an optimal temperature of the set of battery cells. The at least one PCM metal foam 142 is disposed at spaces of the set of battery cells 140 for cooling and uniform temperature distribution on the surface of the set of battery cells 140, and to increase the heat transfer coefficient. The phase change materials disposed at spaces between the set of battery cells 140 at lateral portion 168 comprises lower porosity. The phase change materials disposed at spaces between the set of battery cells 140 at middle portion 170 comprises higher porosity, shown in FIG. 8.

The PCM metal foams 142 comprising high heat capacity acts as a temporary cooler for the set of battery cells 140. The PCM metal foams 142 are used to cool the set of battery cells 140 during the initial use of the electric vehicle. The cooling effect of the PCMs largely relies on the hidden thermal absorption capacity of the phase change materials, therefore, the temperature control performance of the phase change materials would decrease substantially after all the PCMs have become liquid. Therefore, for long-term charging and discharging operations and to increase the coefficient of heat transfer between the transformer materials PCM metal foams 142 are used.

Figure 3:
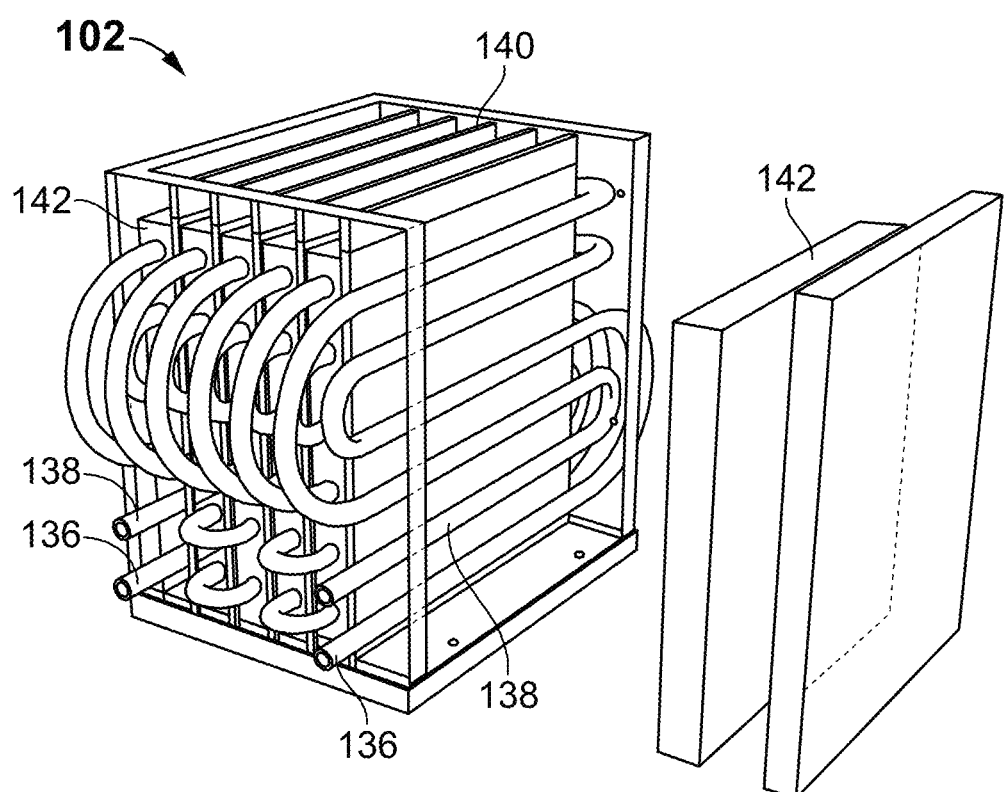
FIG. 3 exemplarily illustrates at least two cooling pipes of a cooling circuit, according to an embodiment of the present invention.

Referring to FIG. 3, the thermal management system 100 comprises the cooling circuit having at least two cooling pipes (138, 136) extending through each PCM metal foam 142 in thermal communication with the set of battery cells 140. The at least two fluid pipes (138, 136) have opposing fluid paths. Each fluid pipe (138, 136) comprises an inlet and an outlet. The at least two fluid pipes (138, 136) are configured to circulate heat exchanging fluid. The at least two fluid pipes (138, 136) transfer heat saturated in the PCMs out of the energy storage module 102. For example, aluminium pipes with high heat transfer coefficient properties are placed inside the energy storage module 102 in such a way that it distributes the temperature throughout the set of battery cells 140 with two opposing fluid flow paths. This causes cells to experience the minimum temperature difference in addition to reducing their temperature.

Figure 4:
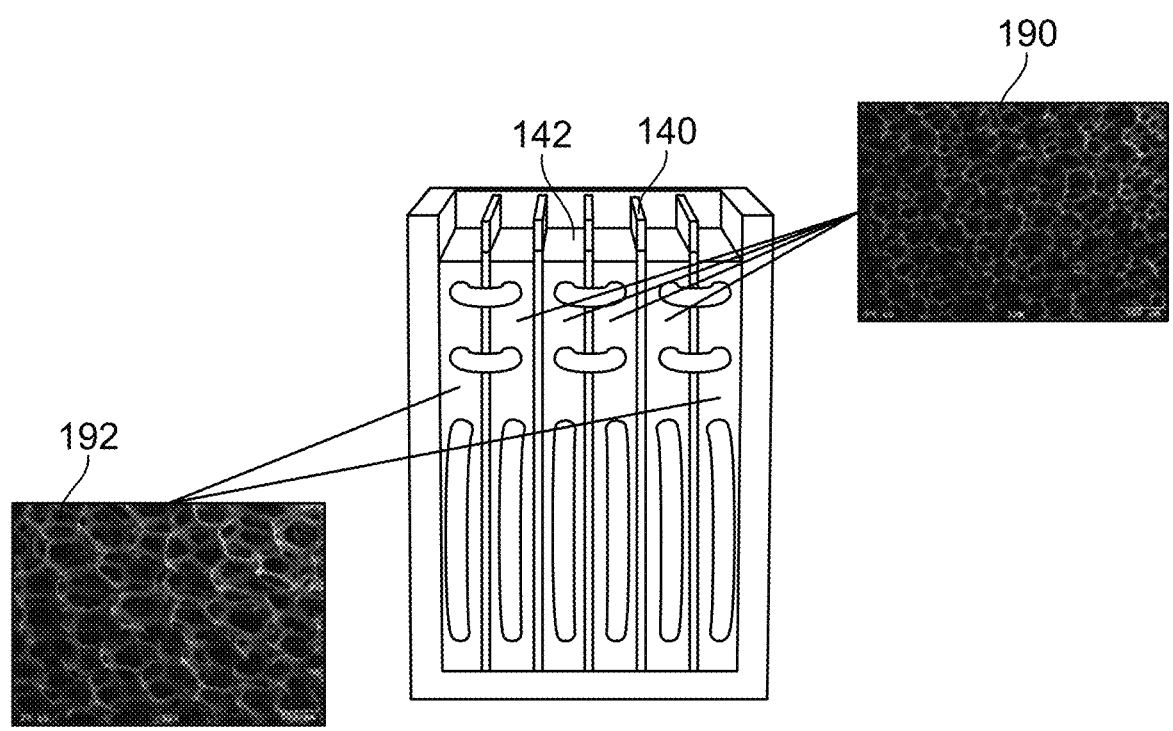
FIG. 4 exemplarily illustrates types of porosity used in PCM metal foam at the lateral and middle cells of the battery module, according to an embodiment of the present invention.

Referring to FIG. 4, the type of foam in the PCMs are selected according to the position of each battery cell 140. The flow of heat exchanging fluid in two opposite directions results in a uniform temperature distribution at each section of the PCM metal foam 142 located between the set of battery cells 140.

However, the PCM metal foam 142 at the lateral portion 168 comprises only one adjacent cell and despite the heat exchange with the ambient temperature by the sidewalls of the housing 186, there would be difference in the temperature escalation compared to the battery cells 140 in the middle of the battery module 102. The cooling rate in the lateral battery cells 140 is usually slightly higher, causing the temperature of the two lateral cells 140 to be slightly different from the battery cells 140 in the middle of the battery module 102. The porosity of the foam is directly proportional to the heat transfer coefficient. Therefore, to address this issue, two types of foam with two different porosity levels were used to balance the temperature of the lateral and middle cells 140 of the battery module 102.

In one embodiment, high porosity foams 190 are used in the PCMs at the middle portion 170 of the battery module 102 and low porosity foams 192 are used in the PCMs at the lateral portion 168 of the battery module 102. This makes the heat transfer in the PCMs used in the middle portion 170 of the module 102 be greater than the heat transfer of the PCMs at the lateral portion 168. Therefore, this method could compensate for the temperature difference between the two side battery cells 140 and the middle battery cells 140 of the battery module 102.

Referring to FIG. 1, the first cooler module comprises a radiator 104 and a cooling fan 106. The second cooler module comprises a cooling fan 124, a condenser 122, a compressor 120, an evaporator 126, an expansion valve 118 and a heat exchanger 114. The system 100 further comprises a water pump or pump 116 in communication with the controller. The first cooler module in communication with the cooling circuit is configured to cool the set of battery cells 140 by circulating the heat exchange fluid via a first coolant path. The second cooler module in communication with the cooling circuit is configured to cool the set of battery cells 140 by circulating the heat exchange fluid via a second coolant path. The controller in communication with the first cooler module, the second cooler module and the temperature sensor 156. The controller is configured to activate the first cooler module on failure to maintain the optimal temperature by the PCM metal foams 142. The controller is configured to activate the second cooler module on failure to maintain the optimal temperature by the first cooler module.

The system 100 further comprises a first connecting pipe 128 configured to connect the outlets of at least two cooling pipes (136, 138) to an inlet of the first cooler module. The system 100 further comprises a second connecting pipe 130 configured to connect an outlet of the first cooler module to an inlet of the heat exchanger 114 of the second cooler module. The system 100 further comprises a third connecting pipe 132 configured to connect an outlet of the heat exchanger 114 of the second cooler module to the inlets of at least two cooling pipes (136, 138). The system 100 further comprises a bypass pipe 134 configured to connect the outlet of the first cooler module and the outlet of the heat exchanger 114 of the second cooler module.

The system 100 further comprises a three-way motorized valve 108 configured to connect the inlets of second connecting pipe 130 and the bypass pipe 134 to the outlet of the first cooler module. The system 100 further comprises a three-way pipe 110 configured to connect outlets of third connecting pipe 132 and the bypass pipe 134 to the inlets of at least two cooling pipes (136, 138). The pump 116 is disposed between the three-way pipe 110 and the inlets of the at least two cooling pipes (136, 138). The heat exchange fluid flowing through the first connecting pipe 128 and the bypass pipe 134 form the first coolant path. The heat exchange fluid flowing through the first connecting pipe 128, the second connecting pipe 130 and the third connecting pipe 132 form the second coolant path. The third connecting pipe 132 comprises a check valve 112 to prevent backflow of the heat exchanging fluid to the heat exchanger 114 of the second cooler module.

Still referring to FIG. 1, the operation of the system 100 is disclosed in detail, according to an embodiment of the present invention. The system 100 is configured to provide at least three cooling methods based on weather conditions or the amount of heat produced by the set of battery cells 140 to cool or dissipate heat from the housing 186 of the energy storage module 102.

According to the present invention, at mild weather conditions or at low charge or discharge rates, when the PCM metal foams 142 are in solid state, cooling of the set of battery cells 140 are performed by PCM metal foams 142 without any energy consumption to cool the cells 140. When the temperature of the battery cells 140 is relatively high enough for the PCM metal foams 142 to lose the cooling properties, the controller is configured to detect the temperature rise using the temperature sensor 156 embedded in the housing 186 of the energy storage module 102. Thereafter, the controller utilizes the first cooler module and circulates heat exchanging fluid in the cooling circuit and controls the temperature of the set of battery cells 140. If the temperature of the battery cells 140 is acute (at high rates of charge or discharge or air heat) and the first cooler module no longer has the ability to cool the battery cells, the system 100 is configured to perform cooling operation using the second cooler module that uses refrigeration for performing cooling operation.

In one embodiment, the operation of the first cooler module is disclosed. The heat exchanging fluid is circulated inside the energy storage module 102 via the radiator 104 and the cooling fan 106. The radiator 104 and fan 106 are configured to perform the role of the heat exchanger 114. In addition, in order to prevent water pressure drop, which would increase energy consumption, concurrent with the system 100 using only water-cooled mode, the heat exchanging fluid is controlled by the three-way motorized valve 108.

The first cooler module circulates heat exchanging fluid via the first coolant path connecting the first connecting pipe 128, the radiator 104 and the bypass pipe 134. The heat exchanging fluid from the radiator 104 reaches the three-way pipe 110 via the bypass pipe 134, instead of passing through the plate heat exchanger 114. The heat exchanging fluid is pumped into the housing 186 of the energy storage module 102 via the pump 116. Also, the check valve 112 deters water from returning to the plate heat exchanger 114 before the three-way pipe 110. As a result, this would lead to lower water pressure, which reduces energy consumption while using the system 100.

In one embodiment, the operation of cooling the energy storage module 102 utilizing the second cooler module is disclosed. The system 100 is configured to utilize the second cooler module when the temperature of the cells 140 is too high and the first cooler module fails to respond to the cooling of the cells 140 (at very high charge and discharge rates or ambient heat), by detecting heat by the temperature sensor 156. The second cooler module utilizes a refrigeration cycle, where the part of the plate heat exchanger 114 is incorporated.

The water, after leaving the battery housing, enters the radiator 104 and partially removes its heat. Then, the three-way motorized valve 108 turns the fluid into the plate heat exchanger 114. At this exchanger 114, the fluid is completely cooled and, eventually, enter into the battery housing 186 again. This cycle continues until the temperature of the battery cells 140 drops.

Figure 5:
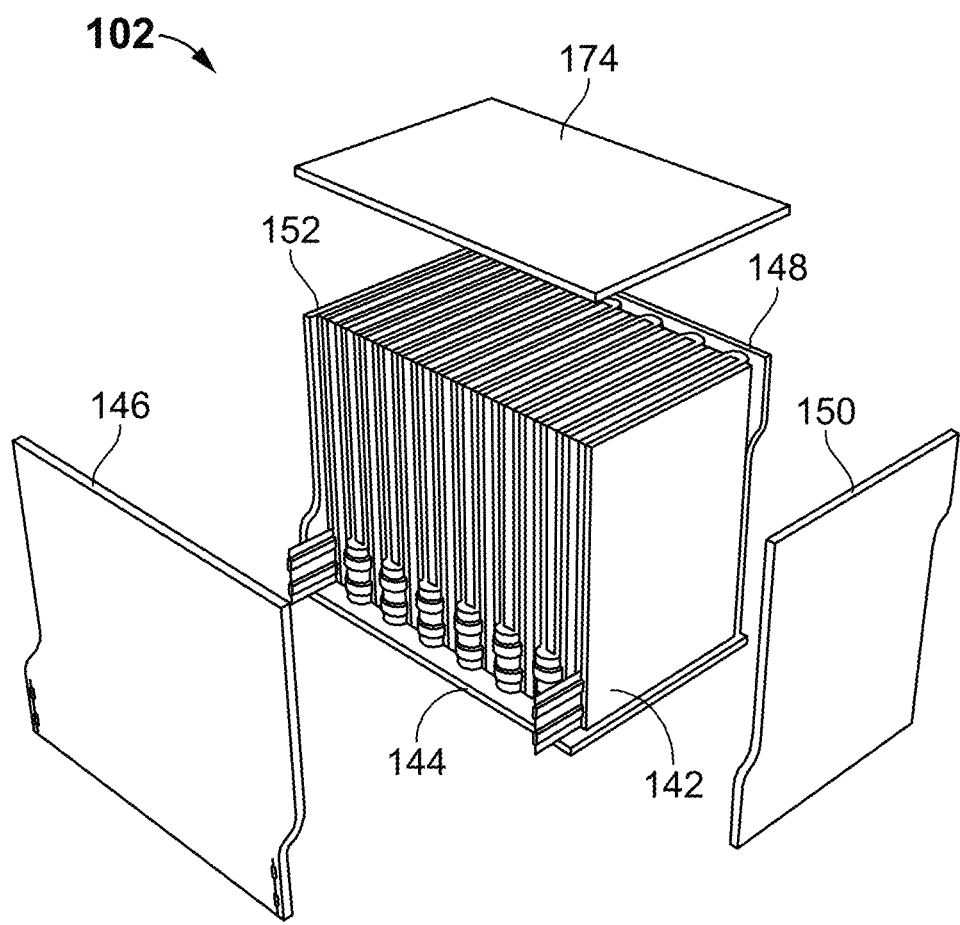
FIG. 5 exemplarily illustrates a compact packing of the energy storage module, according to an embodiment of the present invention.

Referring to FIG. 5, an example of the energy storage module or battery module 102 is disclosed. In FIG. 5, a design of packaging is proposed for the module 102 in a compact manner that could increase the energy density of the module 102 and performance at low cost of construction. Further, FIG. 5 shows an example of the battery module 102 package in which cooling pipes (136, 138) made of metal sheets/plates with high heat transfer coefficients, for example, aluminium and copper, are used and could speed up cooling of the cells 140.

The plates could circulate the water in two separate ways by creating water path forms on the sheets and bending it in series between cells 140 inside the battery module 102. They are also eventually placed in the empty space between the battery cells 140 and the plates formed by the flow path of the PCM metal foam 142. The cross-sectional area of the water-cool paths created on metal sheets could be circular or elliptical. Routes with an elliptical or rectangular cross-section could be used to make compact packages of battery modules 102 as well as to increase the surface area of fluid contact with the sheets for greater heat transfer.

Figure 6A:
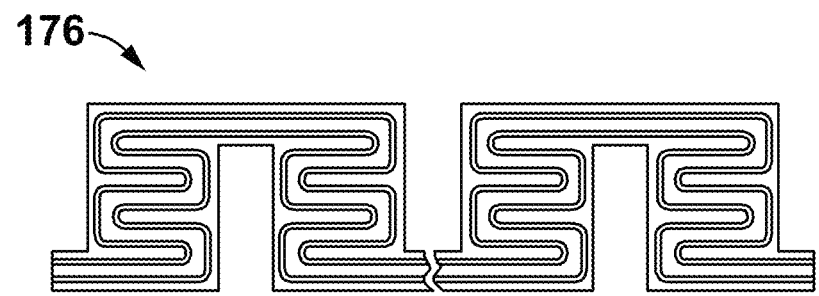
FIG. 6A exemplarily illustrates an unfolded sheet metal, according to an embodiment of the present invention.
Figure 6B:
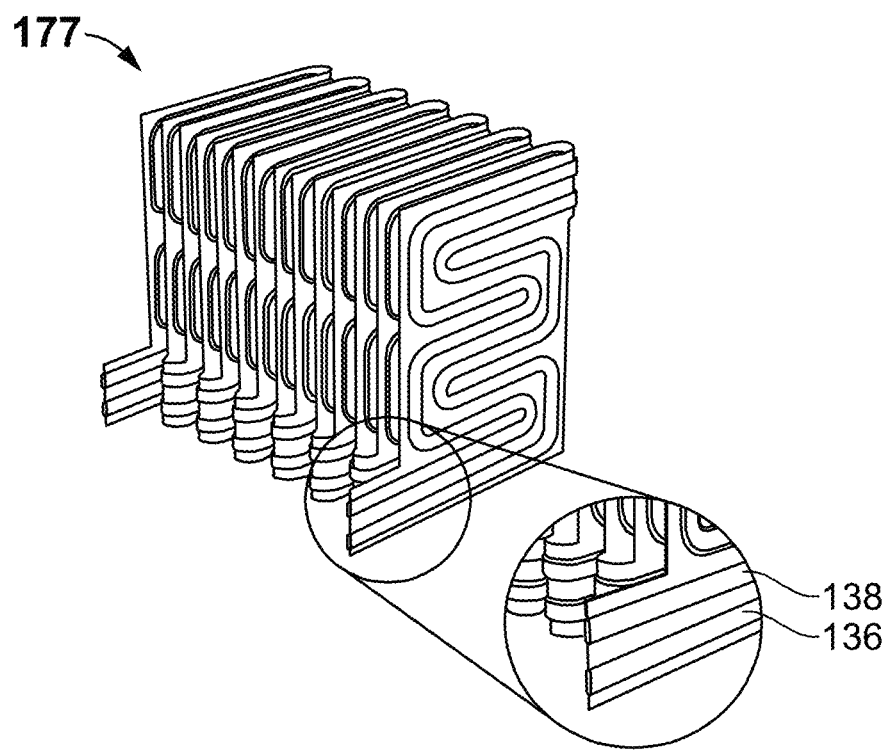
FIG. 6B exemplarily illustrates a folded sheet metal incorporated with at least two cooling pipes, according to an embodiment of the present invention.
Figure 7:
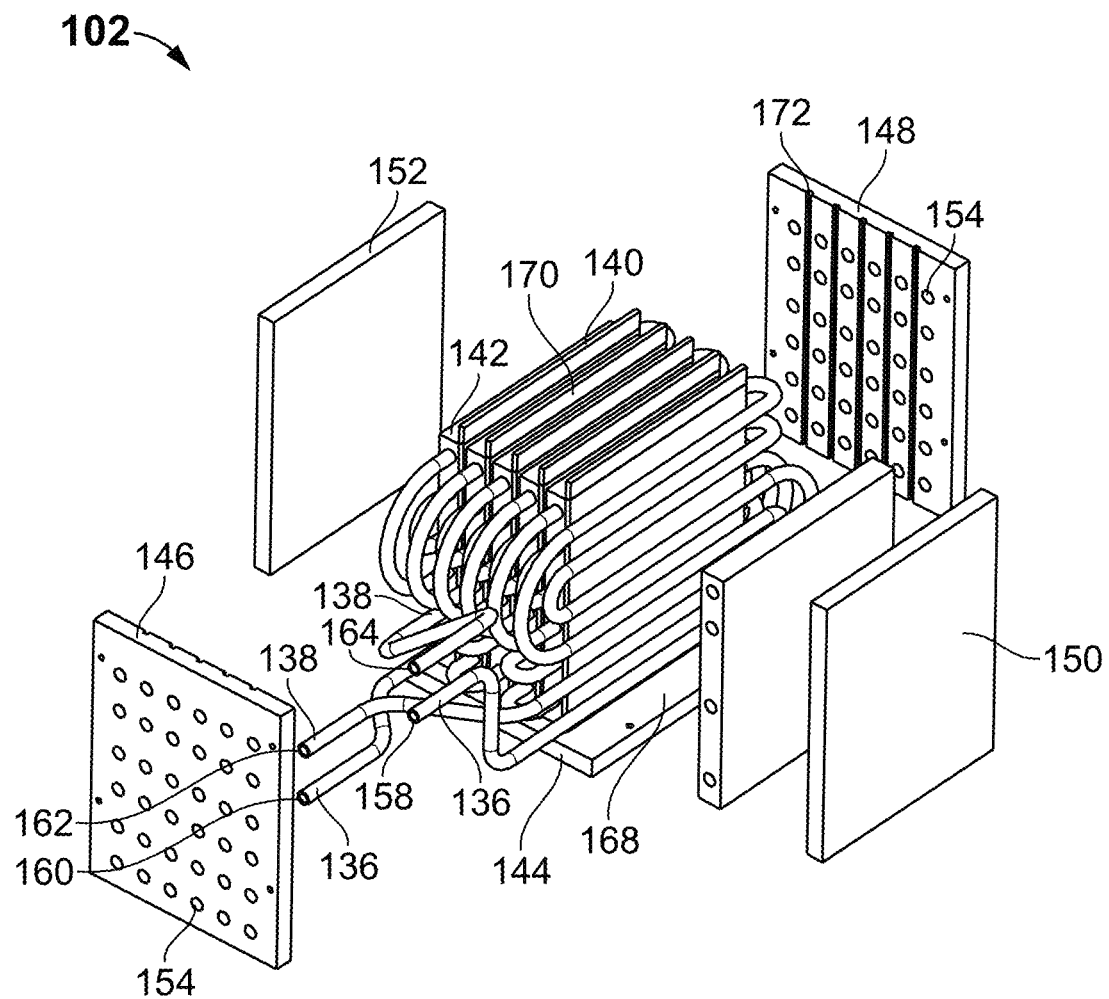
FIG. 7 exemplarily illustrates an exploded view of housing of the energy storage module, according to an embodiment of the present invention.

In one embodiment, the housing 186 is formed of a rectangular base plate 144, at least four plates extending from the rectangular base plates 144 to form a cavity to enclose the battery cells 140. The at least four plates includes a front plate 146, a back plate 148 and at least two side plates (150,152). A case lid 174 is disposed above the cavity. FIG. 6A exemplarily illustrates an unfolded sheet metal 176, according to an embodiment of the present invention. The cooling circuit is embedded or formed in the unfolded sheet metal 176. FIG. 6B exemplarily illustrates a folded sheet metal 177 incorporated with at least two cooling pipes (136, 138), according to an embodiment of the present invention. The cooling circuit is embedded or formed in the folded sheet metal 177. FIG. 7 exemplarily illustrates an exploded view of housing 186 of the energy storage module 102, according to an embodiment of the present invention.

The energy storage module 102 comprises the set of battery cells 140 connected in series and parallel. At least one phase change material metal foam 142 disposed at spaces of either side of each battery cells 140 is configured to cool and maintain an optimal temperature of the set of battery cells 140. The PCM-metal foam 142 at lateral portion 168 comprises low porosity. At least two cooling pipes (136, 138) extend through each phase change material in thermal communication with the set of battery cells 140. At least two cooling pipes (136, 138) comprises respective inlets (162, 160) and outlets (164, 158). The energy storage module 102 is enclosed in the housing 186.

In one embodiment, the housing 186 is formed of the rectangular base plate 144, at least four plates extending from the rectangular base plate 144 to form the cavity to enclose the battery cells 140. The at least four plates includes the front plate 146, the back plate 148 and at least two side plates (150, 152). The front plate 146 and the back plate 148 comprise plurality of holes 154 for passage of at least two pipes (136, 138) of the cooling circuit. The front plate 146 and the back plate 148 further comprises grooves 172 for placement of battery cells 140 in the cavity of the housing 186.

Figure 8:
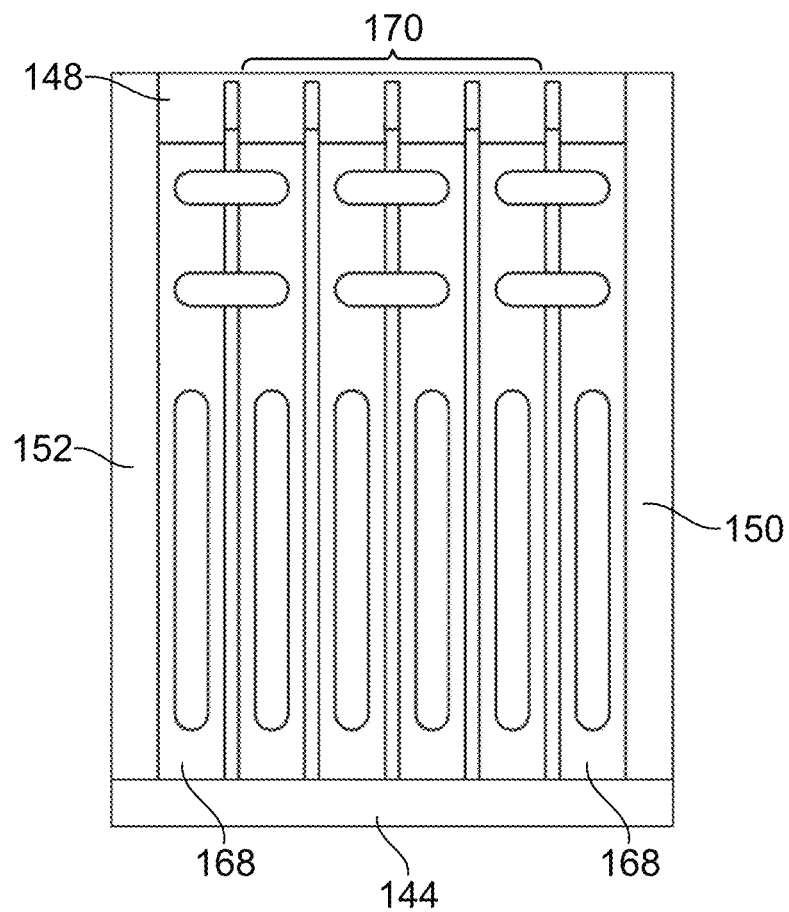
FIG. 8 exemplarily illustrates a front cross-sectional view of the energy storage module, according to an embodiment of the present invention.
Figure 9:
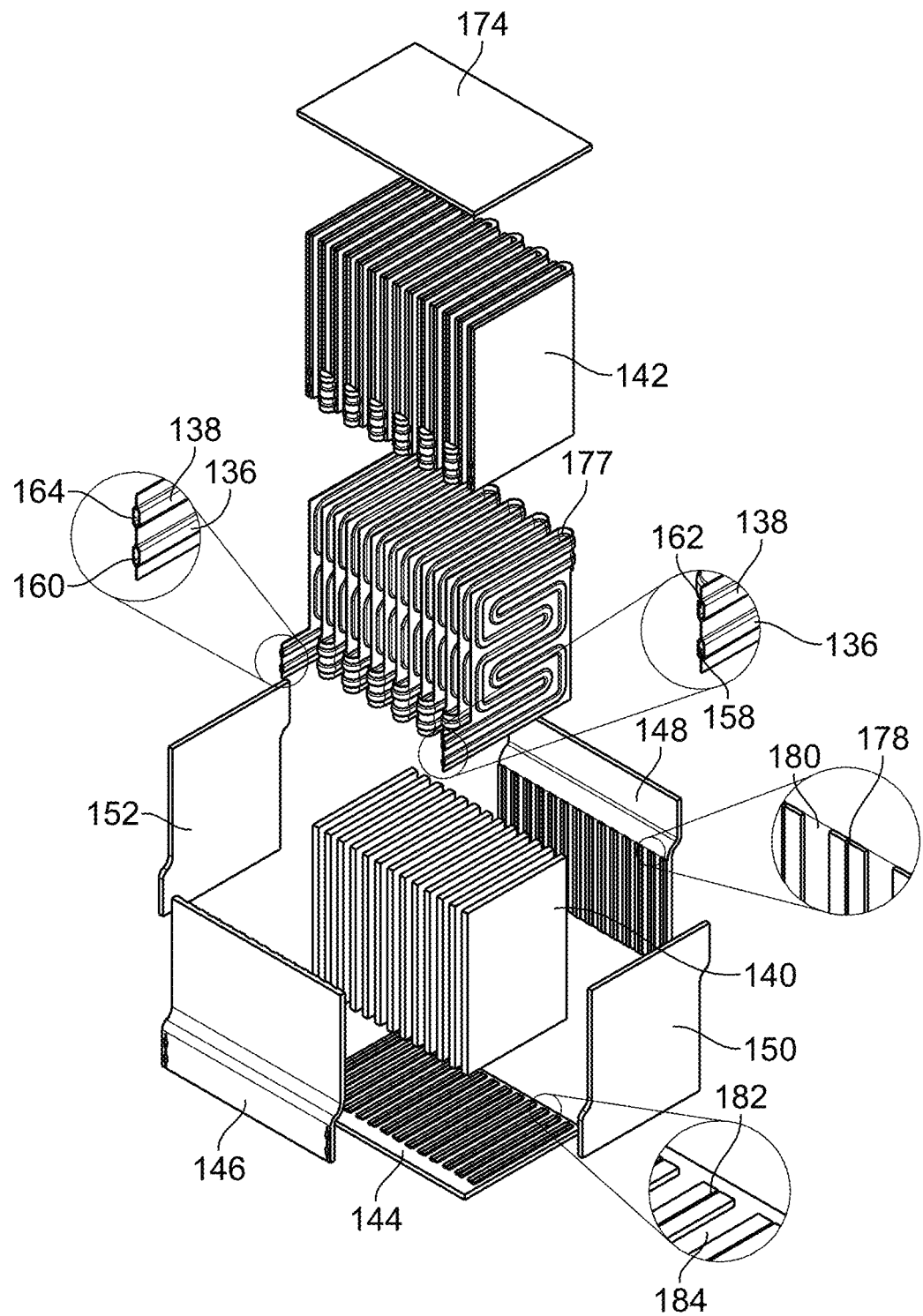
FIG. 9 exemplarily illustrates an exploded view of the energy storage module, according to an embodiment of the present invention.

FIG. 8 exemplarily illustrates a front cross-sectional view of the energy storage module 102, according to an embodiment of the present invention. PCM metal foams 142 at the middle portion 170 and PCM metal foams 142 at the lateral portion 168, battery cells 140, the back plate 148 and at least two side plates (150, 152) are shown. FIG. 9 exemplarily illustrates an exploded view of the energy storage module 102, according to an embodiment of the present invention. The energy storage module 102 comprises the set of battery cells 140 connected in series and parallel.

At least one PCM metal foam 142 disposed at spaces of either side of each battery cells 140 is configured to cool and maintain an optimal temperature of the set of battery cells 140. The PCM metal foams 140 at the lateral portion 168 comprises low porosity. At least two cooling pipes (136, 138) extend through each PCM metal foam 142 in thermal communication with the set of battery cells 140. At least two cooling pipes (136, 138) comprises respective inlets (162, 160) and outlets (164, 158).

In one embodiment, the housing 186 is formed of the rectangular base plate 144, at least four plates extending from the rectangular base plates 144 to form the cavity to enclose the battery cells 140. The at least four plates includes the front plate 146, the back plate 148 and at least two side plates (150, 152). The front plate 146 and the back plate 148 comprise plurality of holes 154 for passage of at least two pipes (136, 138) of the cooling circuit. The front plate 146 and the back plate 148 further comprise a first set of grooves 180 for placement of battery cells 140 in the cavity of the housing 186. The front plate 146 and the back plate 148 further comprise a second set of grooves 178 for placement of PCM metal foam 142. The rectangular base plate 144 comprises a third set of grooves 182 to receive and support sheet metal embedded with cooling circuit. The rectangular base plate further comprises a fourth set of grooves 184 for supporting the battery cells 140 at the bottom of the housing 186.

Figure 10:
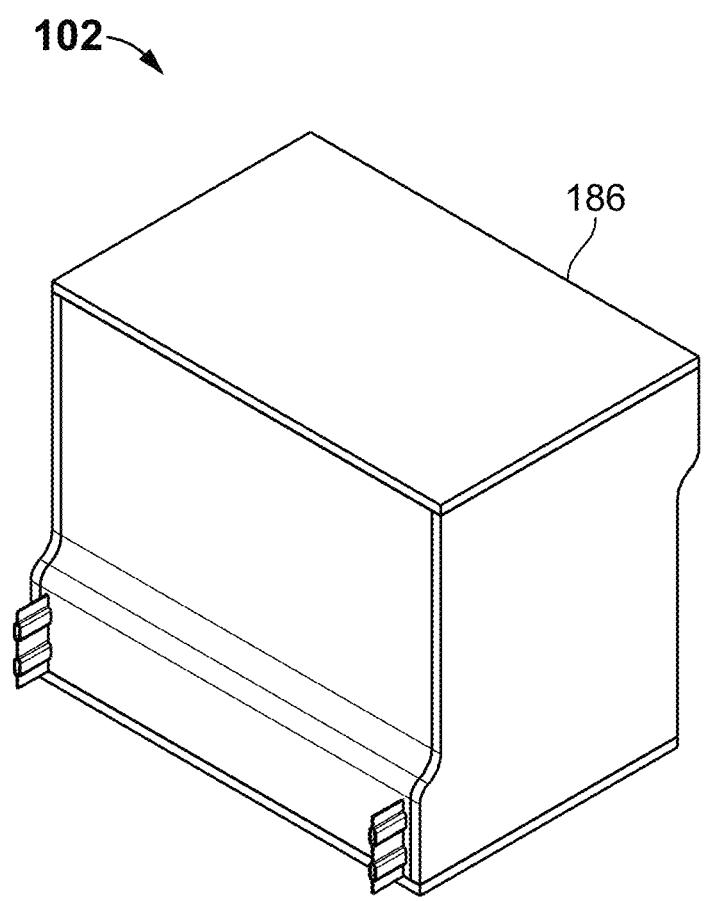
FIG. 10 exemplarily illustrates the energy storage module enclosed in the housing, according to an embodiment of the present invention.

FIG. 10 exemplarily illustrates the housing 186 of the energy storage module 102, according to an embodiment of the present invention. In one embodiment, the use of the refrigeration cycle by the second cooler module is disclosed in detail. The refrigeration cycle of the second cooler module used in the battery module 102 could be used both separately and jointly in the cabin and battery cooling, reasons that could be considered for shared use for cabin and battery cooling are in fully expressed in the following: The cooling volume of the battery module 102 is far lower than the amount of cooling used in the vehicle or car cab, so a small portion of the car's cooler power could be employed to cool the battery module 102. If the coolant required for the battery module 102 is less than 20% of the coolant required for the vehicle cooler, the compressor could be used to cool the battery cells 140, as the compressor power of most vehicles, especially small cars is over-design (too much design in performance). Ultimately, if not responsive, a larger compressor should be used. It should also be noted that the cost of a larger compressor is far less than the two smaller compressors.

The operating temperature range of the battery module 102 is much higher than the optimum temperature in the car cab, which is be deemed equivalent to the fact that the operating temperature of these battery cells 140 is in the temperature range of 20 to 40° C., while the appropriate temperature in the cabin is approximate. It is 20 to 25 degrees; as a result of the energy consumption for cabin cooling in the warm season, it is expected to have more work and energy consumption than battery cooling.

The present invention utilizes three cooling methods step-by-step, thus requiring no direct and continuous use of the refrigeration cycle, as the battery module 102 are initially cooled by PCM metal foam 142 without using the refrigeration cycle. After some time as the temperature of the battery module 102 rises (if cooling of PCM metal foam 102 is no longer possible to cool the batteries), the first cooler module or cooling water system enters the circuit and cools the battery module 102 with minimal energy consumption.

If the temperature of the batteries rises higher and the cooling water system no longer responds to the cooling of the battery module 102, then the cooling cycle of the refrigerant by a plate heat exchanger 114 (the amount of heat dissipation in the form of heat exchanger 114, considerably at the lowest level) enters the cooling circuit and effectively cools the cooling water cycle and ultimately the battery module 102 reaches their operating temperature range.

A significant amount of cell temperature is first removed from the battery module 102 by the cool water cycle of the radiator 104 and, as a result, by lowering a significant part of the temperature, the energy consumption in the refrigeration cycle will be reduced due to less work.

The cooling cycle of the refrigeration will operate automatically, depending on the temperature of the cells 140, and will not operate consistently. For example, at long distances and at high speeds with using maximum battery power, the first cooler module would continue to cool the battery module 102 to a large extent, repelling much of the battery's heat by the radiator 104. If the temperature of the battery module 102 goes above normal, in spite of the cooling water cycle/first cooler module operation, the refrigeration cycle/second cooler module is activated for a short time, then, the battery's or cells 140 temperature drops to a decent level following the time the battery module 102 have cooled down. After reaching the temperature in optimum range, the refrigeration cycle stops, and the cooling water cycle again deals with battery cells 140 cooling alone.

The present invention maintains the battery cells 140 at optimum operating temperature to increase the performance and life of the battery cells 140. The improved battery performance results in increase in the performance and efficiency of the vehicle or electric car. This would ultimately increase the popularity of these types of cars, which could be increased by producing and consuming these cars. The release and emission of pollutants into the environment and air pollution having turned out to be of the most serious threats today could be prevented by the present invention. The system also employs two different types of cooling, depending on the two temperate and warm climates. The battery module 102 embedded with PCM-metal foam 142, with an innovative arrangement, are positioned in two opposite liquid flows so that they could equally distribute temperature in the space between the cells 142, which would significantly reduce the temperature difference between the cells 142.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A thermal management system, comprising:
   an energy storage module comprising a set of battery cells, and a temperature sensor;
   at least one phase change material (PCM)-metal foam disposed at spaces of either side of each battery cells configured to cool and maintain an optimal temperature of the set of battery cells;
   a cooling circuit comprises at least two cooling pipes extending through each PCM-metal foam in thermal communication with the set of battery cells, wherein the at least two cooling pipes have opposing fluid flow paths;
   a first cooler module in communication with the cooling circuit configured to cool the set of battery cells by circulating a heat exchange fluid via a first coolant path;
   a second cooler module in communication with the cooling circuit configured to cool the set of battery cells by circulating the heat exchange fluid via a second coolant path, and
   a controller in communication with the first cooler module, the second cooler module and the temperature sensor, wherein the controller is configured to activate the first cooler module on failure to maintain the optimal temperature by the PCM-metal foam, and wherein the controller is configured to activate the second cooler module on failure to maintain the optimal temperature by the first cooler module and the PCM-metal foam.

2. The system of claim 1, further comprises a pump in communication with the controller.

3. The system of claim 1, wherein the first cooler module comprises a radiator and a cooling fan.

4. The system of claim 1, wherein the second cooler module comprises a cooling fan, a condenser, a compressor, and a heat exchanger.

5. The system of claim 1, further comprises a first connecting pipe configured to connect outlets of at least two cooling pipes to an inlet of the first cooler module.

6. The system of claim 1, further comprises a second connecting pipe configured to connect an outlet of the first cooler module to an inlet of the second cooler module.

7. The system of claim 1, further comprises a third connecting pipe configured to connect an outlet of the second cooler module to inlets of at least two cooling pipes.

8. The system of claim 1, further comprises a bypass pipe configured to connect the outlet of the first cooler module and the outlet of the second cooler module.

9. The system of claim 1, further comprises a three-way motorized valve configured to connect the inlets of second connecting pipe and the bypass pipe to the outlet of the first cooler module.

10. The system of claim 1, further comprises a three-way pipe configured to connect outlets of third connecting pipe and the bypass pipe to the inlets of at least two cooling pipes.

11. The system of claim 2, wherein the pump is disposed between the three-way pipe and the inlets of the at least two cooling pipes.

12. The system of claim 1, wherein the heat exchange fluid flowing through the first connecting pipe and bypass pipe form the first coolant path.

13. The system of claim 1, wherein the heat exchange fluid flowing through the first connecting pipe, the second connecting pipe and the third connecting pipe form the second coolant path.

14. The system of claim 7, wherein the third connecting pipe comprises a check valve to prevent backflow of the heat exchanging fluid to the second cooler module.

15. The system of claim 1, wherein the PCM-metal foam disposed at spaces between the set of battery cells at lateral position comprises lower porosity.

16. The system of claim 1, wherein the PCM-metal foam disposed at spaces between the set of battery cells at middle position comprises higher porosity.

17. A thermal management system, comprising:
   an energy storage module comprising a set of battery cells, and a temperature sensor;
   at least one PCM-metal foam disposed at spaces of either side of each battery cells configured to cool and maintain an optimal temperature of the set of battery cells, wherein the PCM-metal foam disposed at spaces between the set of battery cells at lateral position comprises lower porosity, and wherein the PCM-metal foam disposed at spaces between the set of battery cells at middle position comprises higher porosity;
   a cooling circuit comprises at least two cooling pipes extending through each PCM-metal foam in thermal communication with the set of battery cells, wherein the at least two cooling pipes have opposing fluid flow paths;
   a first cooler module in communication with the cooling circuit configured to cool the set of battery cells by circulating a heat exchange fluid via a first coolant path, wherein the first cooler module comprises a radiator and cooler fan;
   a second cooler module in communication with the cooling circuit configured to cool the set of battery cells by circulating the heat exchange fluid via a second coolant path, wherein the second cooler module comprises a cooling fan, a condenser, a compressor, and a heat exchanger, and
   a controller in communication with the first cooler module, the second cooler module, the temperature sensor, and a pump, wherein the controller is configured to activate the first cooler module on failure to maintain the optimal temperature by the PCM-metal foam, and wherein the controller is configured to activate the second cooler module on failure to maintain the optimal temperature by the first cooler module and the PCM-metal foam.

\* \* \* \* \*